J. K. Marlin.
Hoisting Hogs in Slaughter Houses.
Nº 71628. Patented Dec. 3, 1867.

Witnesses:
J. B. Turchin
Jas. R. Hayden

Inventor:
James K. Marlin

United States Patent Office.

JAMES K. MARTIN, OF CHICAGO, ILLINOIS.

Letters Patent No. 71,628, dated December 3, 1867.

---

IMPROVEMENT IN DEVICE FOR HOISTING HOGS IN SLAUGHTER-HOUSES.

---

The Schedule referred to in these Letters Patent and making part of the same.

---

TO ALL WHOM IT MAY CONCERN:

Be it known that I, JAMES K. MARTIN, of the city of Chicago, in the county of Cook, and State of Illinois, have invented a new and useful device, which I call a "Combination Clutch for Hoisting Hogs," for slaughter-houses; and I do hereby declare that the following is a full and exact description thereof, reference being had to the accompanying drawings, making part of this specification, in which—

Figure 1:
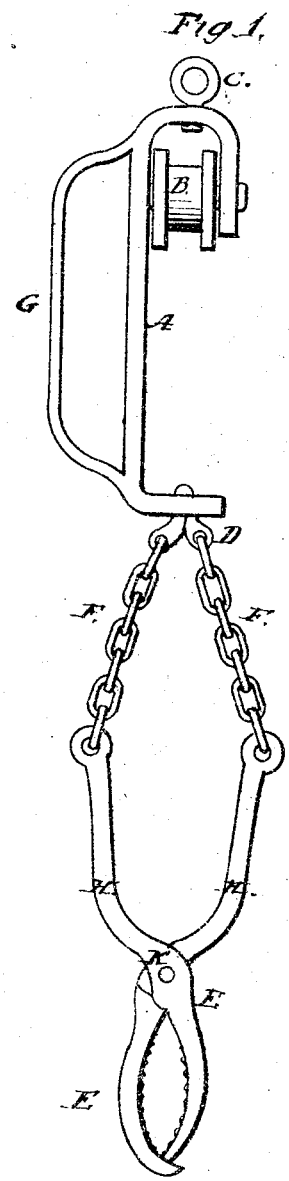

Figure 1 represents the clutch in front, and

Figure 2:

Figure 2 the side view of the clutch proper.

The object of my invention is to provide easy means for slaughter-houses to catch the hogs by the foot and suspend them in the air before they are killed, thus having the hog under control, and preventing any accident to the working-men, at the same time keeping clean the hogs when killed, and having them thoroughly bled, the last thing being very beneficial to the meat.

To enable others skilled in the art to make and use my invention, I will proceed to describe its construction and operation.

My device consists of a heavy iron bar, A, the top of which is bent shoe-like, for the purpose of forming a support for flanged roller B, and a place for an eyelet, C, fixed on a swivel, so that it can turn around, said eye having the object of taking the rope in, on which the whole device can be suspended. The bottom end of the bar A is bent at a right angle, and forms a foundation for the swivel double eyelet D, on which the clutch E is suspended by means of chains, F F. There is a handle, G, welded to the bar A, to support the device with hand. The clutch E itself consists of two bent levers, H H, connected by the pin K. The upper ends of these levers have eyes for the links of the chains to pass through, while their other ends are bent in such way as to form a clutch for the hog's foot, these ends coming one over the other, so as to fit a hog's foot of any size. The inside surface of the clutch is made rough, to produce a better hold. The shape of the clutch, when looked on from a side, has a curved shape, as on fig. 2, for the purpose, when put on the hog's foot, to keep the device off the body of the hog, and to prevent the breaking of the leg, as would have been the case with a straight clutch. The chains F F may be replaced by one-link bars or two-link bars. The device may be made of wrought or malleable iron, or of both combined.

The operation consists in the following: There being two iron tracks, slightly slanting in opposite directions, suspended on supports in the slaughter-house, with their ends coming over a hog-pen, one of which tracks is called a return-track, and the other a hanging-track, the device is suspended on the return-track, its roller, B, lying on the track. After the pen is filled with hogs, the device is thrown off the track; a workman seizes the handle G with one hand, and grasping the clutch E with the other, applies the clutch to a hog's foot, holding the concave side of the same upwards, then the rope is pulled up, the roller B placed on the hanging-track, the hog suspended by the foot and shoved back, stuck with a knife, transferred to the tub, and taken down. With this device the slaughtering operation goes much quicker than in the usual way, and there is no danger to workmen of being hurt by the hogs.

What I claim as my invention, and desire to secure by Letters Patent, is—

The concave-shaped clutch E, as described, suspended on chains or bars, as specified, in combination with bar A and its appendages, (roller, handle, and eyelet,) the whole constructed and operating substantially as herein described and specified.

JAMES K. MARTIN.

Witnesses:
JAS. R. HAYDEN,
J. B. TURCHIN.